(12) United States Patent
Van Zanten et al.

(10) Patent No.: US 6,481,190 B2
(45) Date of Patent: Nov. 19, 2002

(54) METHOD AND DEVICE FOR HARVESTING AGRICULTURAL PRODUCTS, IN PARTICULAR FRUIT

(75) Inventors: Evert Van Zanten, Naaldwijk (NL); Jacob Valstar, Honselersdijk (NL)

(73) Assignees: Valstar W.P.S. B.V., Honselersdijk (NL); Forprema B.V., Hoek van Holland (NL)

( * ) Notice: Subject to any disclaimer, the term of this patent is extended or adjusted under 35 U.S.C. 154(b) by 0 days.

(21) Appl. No.: 09/780,516

(22) Filed: Feb. 12, 2001

(65) Prior Publication Data

US 2001/0035330 A1 Nov. 1, 2001

(30) Foreign Application Priority Data

Feb. 10, 2000 (NL) .............................. 1014338

(51) Int. Cl.[7] .............................................. A01D 91/00
(52) U.S. Cl. ..................... 56/1; 56/329.1; 56/DIG. 2; 47/17
(58) Field of Search ................... 198/300, 346, 198/602, 586, 861.1; 47/17, 18; 56/328.1, 1, DIG. 2

(56) References Cited

U.S. PATENT DOCUMENTS

| | | | |
|---|---|---|---|
| 2,353,638 A | * 7/1944 | Beaulieu et al. | ............ 198/602 |
| 3,352,380 A | 11/1967 | Barney | |
| 4,179,021 A | * 12/1979 | Wallace | ....................... 198/346 |
| 4,736,574 A | 4/1988 | Walker | |
| 4,899,527 A | * 2/1990 | Van Den Munckhof et al. | .......................... 56/328.1 |
| 5,438,794 A | 8/1995 | Wi | |

FOREIGN PATENT DOCUMENTS

| | | |
|---|---|---|
| BE | 651055 | 11/1964 |
| EP | 0 275 602 A1 | 7/1988 |
| NL | 8900200 | 8/1990 |
| NL | 9300315 | 9/1994 |
| NL | 9401186 | 3/1996 |
| NL | 1006427 | 3/1999 |

\* cited by examiner

Primary Examiner—Joseph E. Valenza
(74) Attorney, Agent, or Firm—Young & Thompson

(57) ABSTRACT

The invention relates to a method for harvesting agricultural products, in particular fruit, such as capsicums, tomatoes, cucumbers, aubergines, peppers, etc., from plants which are cultivated in greenhouses. The product-bearing plants are cultivated in parallel rows. Between the rows, processing passages which extend in the longitudinal direction thereof are provided, in such a manner that each row adjoins a processing passage. Between the rows, harvest conveyor tracks which extend in the longitudinal direction thereof are arranged, in such a manner that each row adjoins the harvest conveyor track. The product to be picked from a specific row is harvested from the processing passage which adjoins this specific row, is laid onto the harvest conveyor track which adjoins this specific row and by the harvest conveyor track is removed to a delivery point at one of the ends of the specific row.

17 Claims, 3 Drawing Sheets

METHOD AND DEVICE FOR HARVESTING AGRICULTURAL PRODUCTS, IN PARTICULAR FRUIT

BACKGROUND OF THE INVENTION

The present invention relates to a method for harvesting agricultural products, in particular fruit, such as capsicums, tomatoes, cucumbers, aubergines, peppers, etc., from plants which are cultivated in a greenhouse.

DESCRIPTION OF THE RELATED ART

Greenhouse-cultivated plants of this type are generally cultivated in parallel rows, between which a number of passages are provided. At ground level, these passages are generally provided with two pipes which extend in the longitudinal direction of the said rows and through which water for heating the greenhouse runs. These pipes are generally coupled to one another at one end, for example via a U-shaped pipe section. These passages are also used to inspect and process the plants, inter alia for picking the fruit. If the said heating pipes are laid above the base of these passages, these heating pipes are often also used as rails for one or more trolleys which can travel along them and by means of which, for example, accessories, such as a container for picked fruit, and staff involved in processing the plants, for example pickers in the case of picking, can be moved through the passages. In the case of capsicums, for example, the picking takes place by hand, with the picker standing on one trolley, which is coupled to a trailing trolley provided with a container for the picked capsicums. The picker then has to pick in each case one or more fruit and then turn in order to place the fruit into the container. A large number of fruit, in this case capsicums, are collected in the container, lying on top of one another.

In this arrangement, a significant drawback is that the way in which the fruit are stored in the container leads to damage to the fruit. This is because the fruit will be laid on top of one another, which can cause bruises, among other things. A further problem is that the fruit often drop into the container, which may also lead to damage, in particular bruising, to the fruit. Furthermore, the fruit may scratch one another as a result of the stem of one fruit acting on another fruit. In the case of cucumbers, for example, there is the further problem that they weep at the location of damage and release moisture, and that this moisture forms a good food base for fungi and bacteria. Obviously, these problems could be resolved by laying all the fruit next to one another and constructing the container in levels, which are then filled one by one with fruit lying next to one another. However, this is time-consuming and will have an adverse effect on the number of fruit picked per unit time, i.e. the fruit-picking speed.

Dutch Patent 1,006,427 discloses a harvesting system for harvesting plants, in particular cut flowers. The plants are cultivated in greenhouses in row-like planting beds with walkways between them. In each case pairs of so-called endless cords are arranged parallel to and above the rows of plants. Together, each pair of cords forms a conveyor track. In each pair of cords, in each case one cord lies above the walkway at a higher level than the plant and the other cord lies at a distance above the plant, at the same height as the first cord. This is a harvesting system for cut flowers, i.e. a system with which the entire plant is harvested, not simply products from the plant. Furthermore, the cut flowers are cut off at ground level, while the cords lie at a high level, at a distance above the plant. Therefore, the picker has to constantly stand upright from a bent position in order to place the picked parts of the plant onto the cords, which takes time and is ergonomically unfavourable.

SUMMARY OF THE INVENTION

It is an object of the present invention to provide a method for harvesting agricultural products, in particular fruit, with which it is possible in particular to work at a high rate, i.e. at a high picking speed, and to prevent damage to the products.

According to the invention, this object is achieved by providing a method for harvesting agricultural products, in particular fruit, such as capsicums, tomatoes, cucumbers, aubergines, peppers, etc., from plants which are cultivated in greenhouses, in which the product-bearing plants are arranged in parallel rows, in which processing passages which extend between the said rows, in the longitudinal direction thereof, are provided in such a manner that each row adjoins a said processing passage, in which harvest conveyor tracks which extend between the said rows, in the longitudinal direction thereof, are or have been arranged, in such a manner that each row adjoins a said harvest conveyor track, and in which the products to be harvested, in particular the fruit to be picked, of a specific row are harvested from the processing passage which adjoins this specific row, are laid onto the harvest conveyor track adjoining this specific row, and by the said harvest conveyor track are removed to a delivery point at one of the ends of this specific row.

As a result of the harvested products being laid onto a conveyor belt, the so-called harvesting conveyor belt, which lies at a lower level than the highest level of the plants, between the rows, and possibly beneath the plants, immediately after picking, and using this conveyor belt to discharge the products to a delivery point, it is possible to harvest at a relatively high rate while preventing products from being laid or stacked on top of one another, which could cause them to damage one another. In this context it is conceivable, for example, for the products to be laid automatically or manually into single-layer boxes or other types of containers at the delivery point, but it is also possible for the delivery point to be a further main conveyor track, by which the products from all the harvest conveyor belts are collected and are discharged to a central point for further processing, for example for placing them in boxes or other types of containers.

A further significant problem of the known harvesting method is that it is ergonomically unfavourable. The human harvester, for example picker, frequently has to execute a turning movement, often from a bent-over position, which involves disadvantageous strain on the back, among other things. This constantly repeated turning movement in order to allow the product, for example the capsicums, to be deposited also takes up time, which has an adverse effect on the amount of products which can be picked per unit time, i.e. limits the picking speed. Experienced human harvesters or pickers will attempt to avoid turning their body and back and will mainly use their arms to execute a pivoting movement and lay the products in the container without looking. However, this too is ergonomically unfavourable for the arms and shoulders and also for the neck. Furthermore, in this case too the arm-pivoting movement will represent a delaying factor during harvesting or picking.

According to the invention, this significant further problem is prevented if the harvest conveyor track is arranged in such a manner that a human picker who is standing in the processing passage and looking towards the row of plants has the harvest conveyor track in front of him. More particularly, this further problem is advantageously overcome, according to the invention, if the processing passages and harvest conveyor tracks are in each case separated from one another by a said row which adjoins the two, each processing passage and each harvest conveyor track preferably being delimited on either side by a said row and a manipulating member, such as an arm or hand of a human harvester or picker, which is holding the harvested product or the picked fruit, being pushed out of the processing passage, through the row from which the product has been harvested or the fruit has been plucked, in order to lay the harvested product or the picked fruit onto the harvest conveyor track which adjoins the said row. It is therefore no longer necessary for the body, in particular the upper body, of the human harvester, for example picker, to execute a turning movement or for the arm of the harvester to execute a pivoting movement in order to deposit the fruit. According to the method according to the invention, the product or the fruit is harvested or picked in front of the body of the human harvester or picker, and then the arm is extended and moved slightly upwards or downwards in order to place the fruit onto the harvest conveyor track. Moreover, this movement is also quicker than the turning movement of the body or the pivoting movement of the arm in accordance with the traditional method, which therefore allows a higher harvesting or picking speed to be achieved. Although the method according to the invention in no way rules out the possibility of using a mechanically controlled manipulating member for harvesting or picking and depositing the products or fruit, in the current state of the art, for cost reasons, it is preferable if the harvesting or picking and the laying of the products or fruit onto the harvest conveyor track is carried out manually by a human harvester or picker, who is moving through the processing passage or is being moved through the processing passage. In this case, the human harvester or picker may stand on a trolley which is moved, optionally in steps, through a processing passage, it advantageously being possible for the heating pipes to be used as rails for the trolley. In this case, according to the invention it is particularly advantageous if the human harvester or picker is standing on a platform which can be vertically adjusted for harvesting or picking products or fruit at different heights, the respective harvest conveyor track being correspondingly vertically adjusted, specifically, for preference, being vertically adjusted in such a manner that the height of the harvest conveyor track is approximately 100 to 150 cm higher than the height of the platform. It is thus possible for the human harvester or picker to stand upright and to harvest the products or pick the fruit at standing level and also deposit the products or fruit without having to bend over. It should be noted that it is obviously also eminently possible for a chair or another type of seat to be provided on the platform and for the harvester or picker to sit on this chair or seat, in which case the height difference between the platform and the harvest conveyor track may also be less than 100 cm.

In order to reduce or even prevent altogether the need for the harvesting person to bend or at least move the upper body downwards for the purpose of depositing harvested products, according to the invention it is preferable if the height of the conveyor track is set in such a manner that it is at most 50 cm lower than in each case the highest product, such as fruit, which is to be harvested.

According to a further aspect, the invention relates to a device for harvesting agricultural products, in particular fruit, such as capsicums, tomatoes, cucumbers, aubergines, peppers, etc., which device is particularly intended for carrying out the method according to the invention.

The device according to the invention will in particular comprise a multiplicity of parallel harvest conveyor tracks which are positioned at a distance from one another and are arranged or at least are intended to be arranged alongside a row of plants which yields the products, such as the fruit. The multiplicity of harvest conveyor tracks will preferably be vertically adjustable. The harvest conveyor tracks may in this case, if appropriate, be vertically adjustable separately, i.e. independently of one another. Preferably, each harvest conveyor track will comprise an endless conveyor belt, of which the active conveying part runs through a channel, preferably over the base of the channel. The conveyor belt may then be made from relatively inexpensive material, such as for example car seat-belt material or lorry tarpaulin, since it is supported by the base of the channel and has the sole function of carrying along the products, such as the fruit. The channel has the advantage that the side walls of the channel ensure that the products, such as the fruit, cannot fall off the conveyor belt. A harvest conveyor track of this type, which substantially comprises a channel with an endless conveyor belt, has the further advantage of being of lightweight and simple design. For example, if a roller conveyor were to be used, not only would the harvest conveyor track be of more complex design, but also it would be heavier.

BRIEF DESCRIPTION OF THE DRAWINGS

The present invention will be explained in more detail below with reference to an exemplary embodiment which is illustrated in the drawing, in which.

DESCRIPTION OF THE PREFERRED EMBODIMENTS

Figure 1:
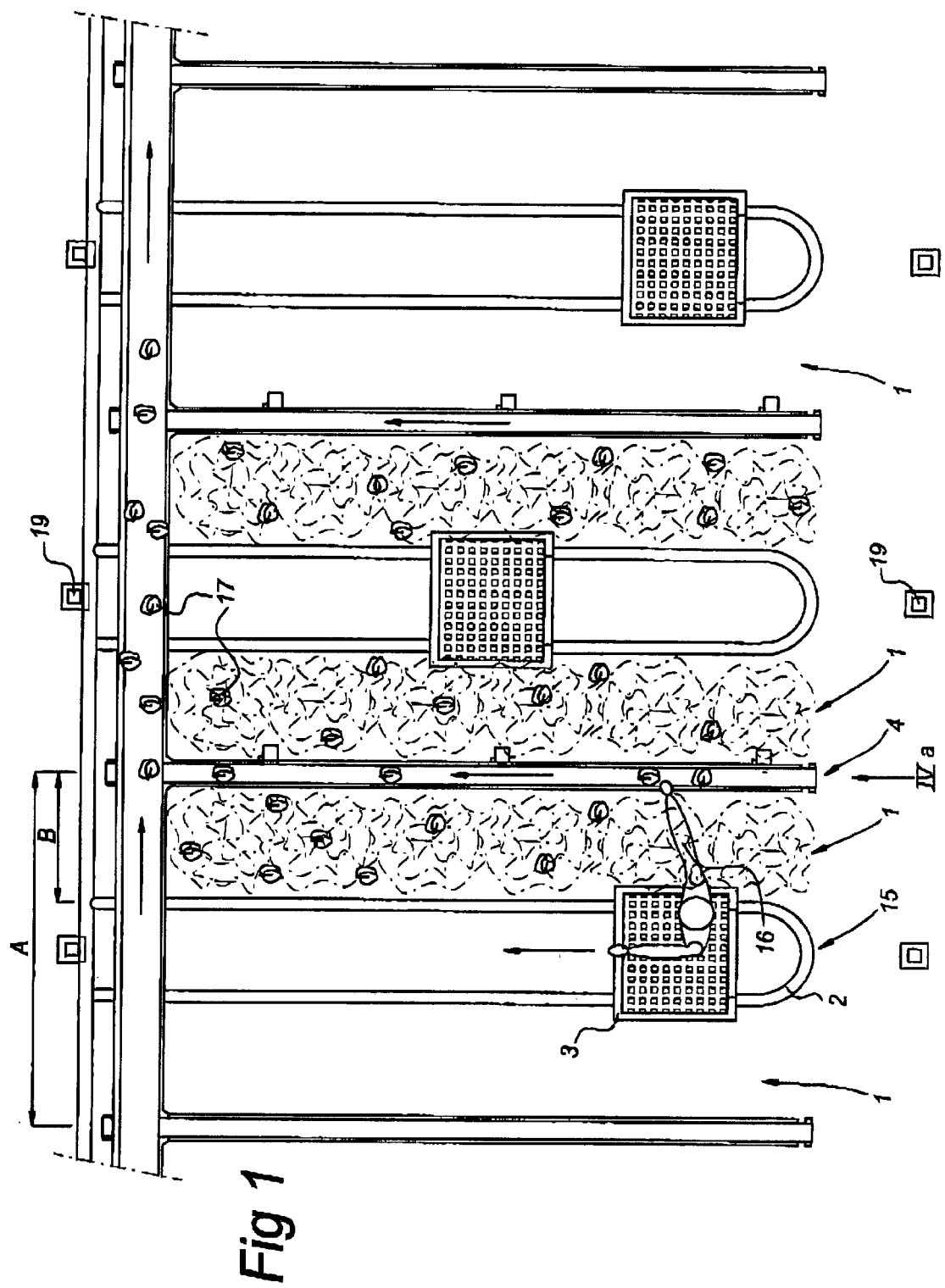
FIG. 1 shows a highly diagrammatic plan view onto/in a greenhouse, which is provided with a device according to the invention for carrying out the method according to the invention.

FIG. 1 shows a plan view of a section of a greenhouse in which capsicums are cultivated. The capsicums are cultivated in rows of plants 1, in three of which the plants have been diagrammatically indicated by dot-dashed lines. The rows of plants run parallel to and at a distance from one another. In a manner known per se, the spaces between adjacent rows are provided, in each case skipping one space, with a heating pipe which runs along the ground and over which, as is also known per se, trolleys 3 can travel, on which staff can stand so that they can be moved along the row of plants with the aid of the trolley, for example for picking purposes, in which case then, according to the conventional method, the picked fruit are deposited in a following trolley (not shown) with collection container.

According to the invention, conveyor tracks which extend in the longitudinal direction of the rows of plants, alongside the said rows of plants, are provided in the spaces which are conventionally left empty between adjacent rows of plants. These conveyor tracks 4 may substantially be of numerous types, for example of the so-called roller conveyor type, of the endless conveyor belt type, of the slat conveyor type, etc.

Figure 2:
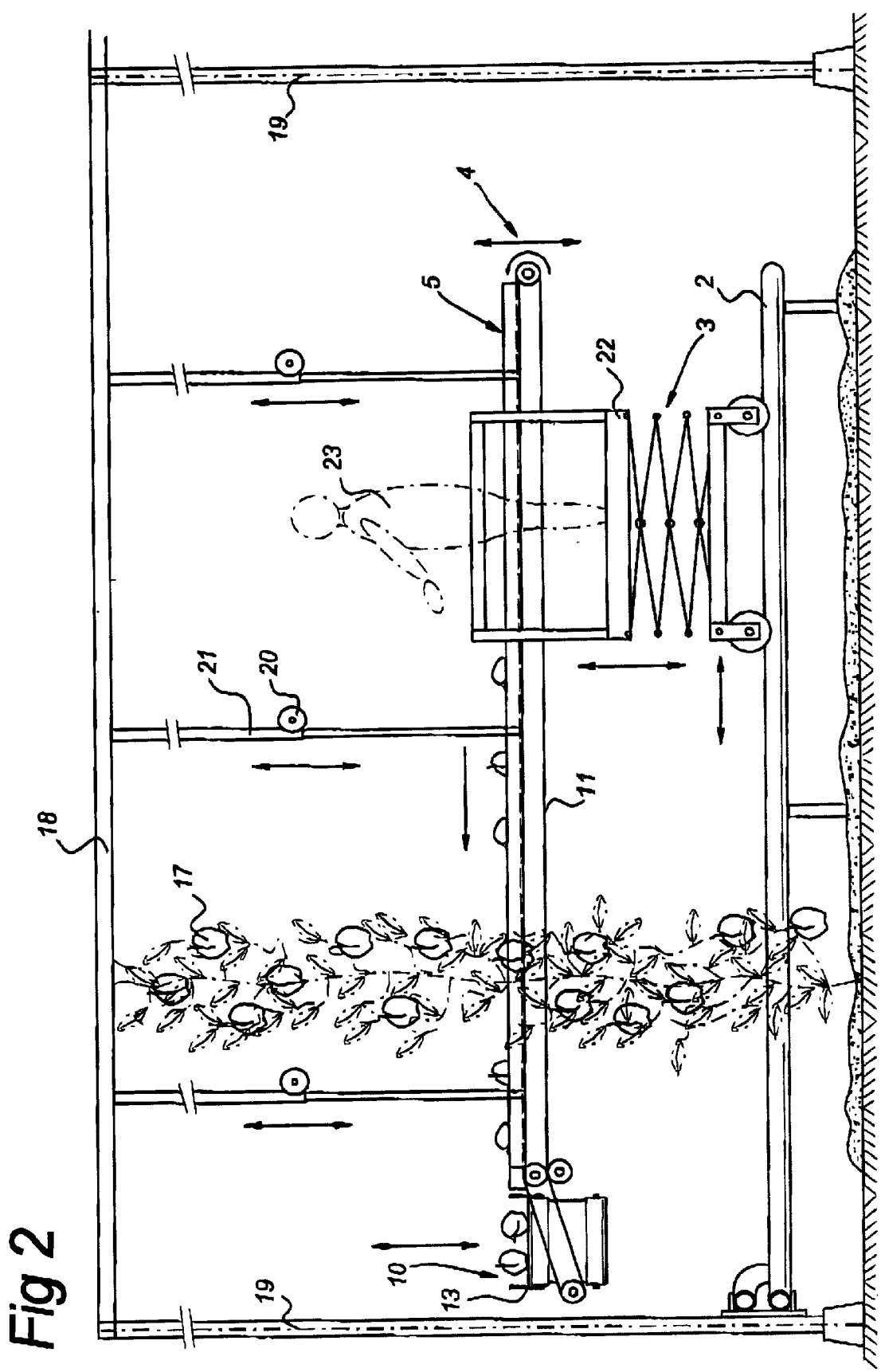
FIG. 2 shows a longitudinal side view of a row of capsicum plants from FIG. 1.
Figure 3:
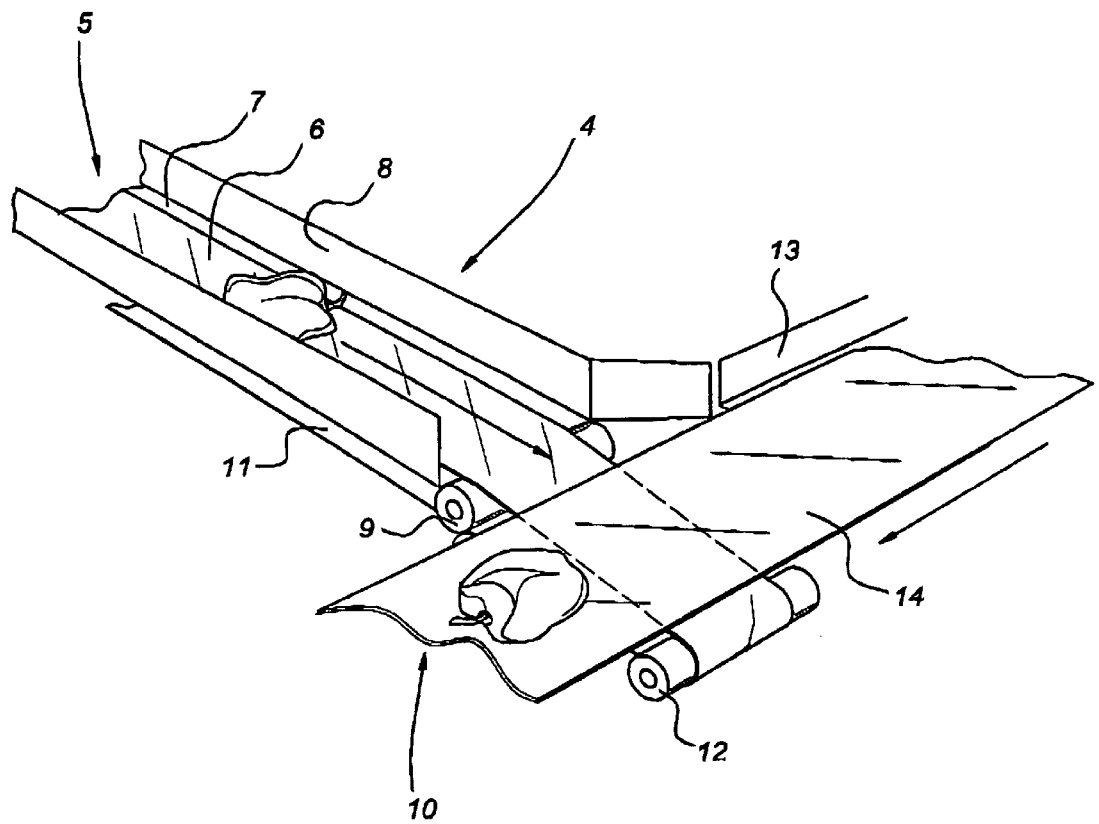
FIG. 3 shows a perspective detail of the way in which a harvest conveyor track adjoins a main conveyor track for further removal of the fruit.

According to the invention, it is preferable if the conveyor tracks 4, also known as harvest conveyor tracks, comprise a channel 5—cf. FIG. 3—through which an endless conveyor belt runs. The active top part 6 of this endless conveyor belt will preferably run over the base 7 of the channel 5, so that the active part is supported on the base 7 of the channel 5. To prevent the fruit from being able to drop laterally off the conveyor belt 6, the channel 5 is provided with side walls 8. It will be clear that the conveyor track 4 may also be formed in other ways. For example, it is conceivable for the conveyor belt 6 itself to be of U-shaped design, in which case the side walls 8 can then be dispensed with. If appropriate, it is then also possible for the U-shaped conveyor belt to be supported by a plate, but this support could also be provided by a multiplicity of rollers. However, the embodiment illustrated in FIG. 3 is highly advantageous on account of its simplicity, low production costs, low weight and consequently its suitability for being suspended from a frame which is generally already present in greenhouses (cf. FIG. 2, which is yet to be discussed).

Referring to FIGS. 1 and 3, each harvest conveyor track 4 emerges, in the downstream direction, at a main conveyor track 10. Although the connection may be designed in numerous ways, for example the active part 6 may be directly returned via, for example, roller 9 in order to run beneath the channel 5 as bottom part 11, it is shown in FIGS. 1 and 3 that the top part 6 of the conveyor belt is guided beneath the main conveyor track 10 at the end of the channel 5 and is returned as bottom part 11 via return pulley 12.

According to the invention, the main conveyor track 10 may advantageously also comprise a channel through which the active part of a conveyor belt of the endless type is guided, preferably over the base thereof, in which case the inactive bottom part can be returned back underneath the channel 13. This channel 13 will preferably also be provided with upright side walls, in order to prevent the fruit resting on the conveyor belt from being able to fall off it. The conveyor belt 14 will generally be wider than the conveyor belt 6, although this is not absolutely necessary.

The centre-to-centre distance A between successive processing packages 15, harvest conveyor tracks 4 or similar rows of plants 1 will, as may conventionally also be the case, be, for example, approximately 160 cm. The distance B between the side of the processing passage 15 and the adjoining conveyor track 4 will then be approximately 40 to 60 cm. This means that the arms 16 of a person standing on trolley 3 can easily reach through the plant path 1 to the conveyor track 4 lying behind it in order to deposit picked fruit 17 thereon. This is possible both if the picker is facing towards the plant path 1 and if the picker, as shown in FIG. 1, is facing in the direction of travel of the trolley 3. In both cases, depositing the picked fruit involves little more than extending the arms 16.

FIG. 2 shows a longitudinal side view of a processing passage 15, a conveyor track 4 and a row of plants located between them, of which only one plant is indicated by dot-dashed lines. The greenhouse is provided with props 19, between which horizontal supporting beams 18 are arranged at a certain height above the ground, which beams may be provided especially for the present invention or may conventionally be present in order, for example, to bear a conventional pulley heating system. Since a conventional pulley heating system generally extends between the rows of plants and parallel to the rows of plants, it may be highly advantageous for the harvest conveyor tracks to be mounted beneath the pulley heating system, so that they can move up and down with the pulley heating system. Telescopic rod systems 21 are suspended from the horizontal supports 18, which rod systems can be extended and retracted via an adjustment mechanism 20, for example by means of a toothed wheel acting on a rack. In this way, the height of the harvest conveyor track 4, and also the main conveyor 10, can be adjusted. Instead of being suspended from supporting beams 18, the telescopic rod systems may also be supported on the ground. Furthermore, the harvest conveyor tracks may also be suspended from cables which can be paid out and hauled in.

FIG. 2 also shows that the harvesting trolley 3, as is known per se from the prior art, is provided with a vertically adjustable platform 22 on which a picker can stand and can be vertically adjusted in order to pick fruit at a higher or lower level.

It will be clear that the vertical adjustment of the harvest conveyor tracks 4 may also take place electrically instead of manually, if appropriate even with remote or central control.

Figure 4A:
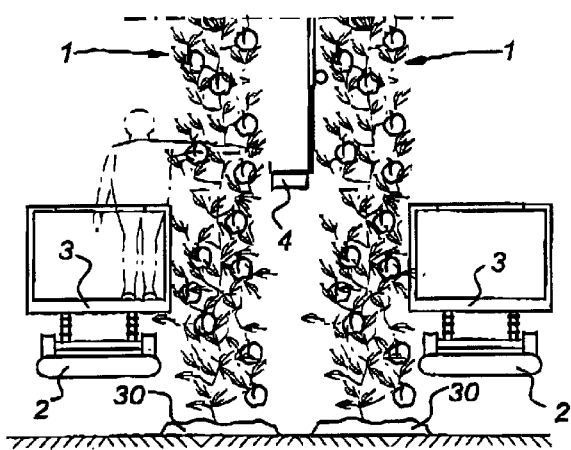
FIG. 4a shows a diagrammatic end view illustrating a plant which has been cultivated in a first way, corresponding to FIGS. 1, 2 and 3.
Figure 4B:
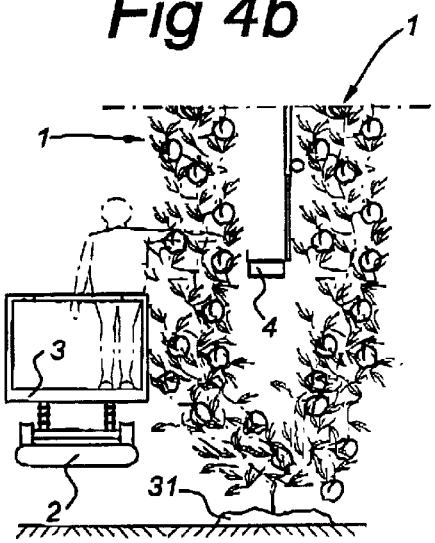
FIG. 4b shows a diagrammatic end view illustrating a plant which has been cultivated in a second way.

FIG. 4a shows a diagrammatic end view, in the direction of arrows IVa from FIG. 1, of the rows of plants 1 with a harvest conveyor track 4 between them. The beds 30 in which the rows of plants 1 grow are in this case more or less physically separated and the harvest conveyor track 4 lies at the level of the physical separation. However, as diagrammatically indicated in FIG. 4b, in an end view which corresponds to that shown in FIG. 4a, within the scope of the invention as laid down in the claims, the rows of plants may also have a common bed 31 and may be split into two rows of plants above the bed, these rows then lying around the harvest conveyor track 4, as it were.

Furthermore, it should be noted that within the scope of the application, the method and device according to the invention may also perfectly well be used in an outdoor field, i.e. outside a greenhouse.

What is claimed is:

1. A method for harvesting agricultural products from plants, comprising the steps of:

cultivating product-bearing plants in parallel rows;

extending processing passages in a longitudinal direction between the parallel rows so that each row adjoins one of the processing passages;

extending harvest conveyor belts in a longitudinal direction between the parallel rows so that each row adjoins one of the conveyor belts, the harvest conveyor belts being positioned in parallel to the processing passages;

providing product delivery points at one end of each of the harvest conveyor belts; and while standing in one of the processing passages, placing product picked from the plants onto a corresponding one of the harvest conveyor belts and operating the corresponding harvest conveyor belt to transport the thus-placed product to a corresponding one of the product delivery points.

2. The method of claim 1, wherein the processing passages comprise a movable platform for a product picker to stand upon and when the product picker stands upon one of the movable platforms on a first side of a row of plants, there is one of the harvest conveyor belts positioned in front of the product picker.

3. The method of claim 2, wherein the one of the harvest conveyor belts positioned in front of the product picker is located on an opposite, second side of the row of plants.

4. The method of claim 2, wherein in the step of standing in one of the processing passages, placing product picked from the plants onto a corresponding one of the harvest conveyor belts, includes the picking being performed by a human harvester, the harvester being moved on a platform along the one processing passage.

5. The method of claim 4, wherein the platform is moved along rails.

6. The method of claim 2, comprising the further step of vertically moving the platform.

7. The method of claim 6, wherein the step of vertically moving the platform adjusts the platform to a height that is at most 50 cm lower than the highest product to be harvested.

8. The method of claim 1, comprising the further step of providing a main conveyor belt positioned to accept product at each of the product delivery points and operating the conveyor belt to further transport the product to a common final delivery point.

9. A agricultural products harvesting system, comprising:
processing passages extending in a longitudinal direction between the parallel rows of product-producing plants so that each of the parallel rows adjoins one of the processing passages;
harvest conveyor belts extending in a longitudinal direction between the parallel rows so that each row adjoins one of the conveyor belts, the harvest conveyor belts being positioned in parallel to the processing passages; and
product delivery points arranged at one end of each of the harvest conveyor belts.

10. The system of claim 9, wherein, the processing passages comprise a movable platform, movable along a length of the processing passages, for a product picker to stand upon,
the movable platform stands on a first side of a row of plants, and
one of the harvest conveyor belts positioned in front of the movable platform.

11. The system of claim 10, wherein the one of the harvest conveyor belts positioned in front of the product picker is located on an opposite, second side of the row of plants.

12. The system of claim 10, wherein the harvest conveyor belts comprise an endless conveyor belt having a conveying part running through a channel having a channel base.

13. The system of claim 11, wherein the harvest conveyor belts are positioned immediately between two rows of plants.

14. The system of claim 10, wherein the platform is vertically adjustable.

15. The system of claim 10, wherein the platform is mounted to a rail system for moving the platform along the length of the processing passages.

16. The system of claim 9, further comprising a removal conveyor belt positioned to accept product at each of the product delivery points and transport the product to a common final delivery point.

17. The system of claim 16, wherein the removal conveyor belt comprises an endless conveyor belt having an active part extending of a channel base.

* * * * *